United States Patent
Gn et al.

(10) Patent No.: US 9,672,581 B2
(45) Date of Patent: *Jun. 6, 2017

(54) MULTIMODAL BIOMETRIC PROFILING

(71) Applicant: Accenture Global Services Limited, Dublin (IE)

(72) Inventors: Madhusudan Gn, Bangalore (IN); Sanjoy Paul, Bangalore (IN); Deepmala Gupta, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,591

(22) Filed: Jul. 18, 2016

(65) Prior Publication Data

US 2016/0328815 A1 Nov. 10, 2016

Related U.S. Application Data

(63) Continuation of application No. 14/481,331, filed on Sep. 9, 2014, now Pat. No. 9,424,478.

(30) Foreign Application Priority Data

Apr. 11, 2014 (IN) .......................... 1900/CHE/2014

(51) Int. Cl.
*G06K 9/00* (2006.01)
*G06T 1/00* (2006.01)
(Continued)

(52) U.S. Cl.
CPC ............ *G06T 1/0092* (2013.01); *G06F 21/00* (2013.01); *G06F 21/32* (2013.01);
(Continued)

(58) Field of Classification Search
CPC .................... G06F 21/00; G06F 21/32; G06K 2009/00953; G06K 9/00892
(Continued)

(56) References Cited

U.S. PATENT DOCUMENTS 6,873,711 B1 * 3/2005 Murakami ............ G06T 1/0028
348/32
2010/0060942 A1 3/2010 Monga et al.

FOREIGN PATENT DOCUMENTS

WO 98/38567 9/1998
WO 2004/031920 4/2004

OTHER PUBLICATIONS

Ratnakirti Roy et al: "Evaluating image steganography techniques: Future research challenges", Computing, Management and Telecommunications (COMMANTEL), 2013 International Conference on, IEEE, Jan. 21, 2013, pp. 309-314.
Anonymous: "Image Steganography", York University, Introduction to Computer Security, Jan. 31, 2014, slides 1-37.
Shuchi Sharma et al: "A High Capacity Data-Hiding Technique Using Steganography", International Journal of Emerging Trends & Technology in Computer Science (IJETTCS), May 31, 2013, pp. 1-4.
(Continued)

*Primary Examiner* — Manuchehr Rahmjoo
(74) *Attorney, Agent, or Firm* — Mannava & Kang, P.C.

(57) ABSTRACT

Multimodal biometric profiling may include receiving a cover image and a biometric template for a person. An indication of a security requirement related to biometric profiling for the person may be received. A threshold value may be determined based on the indicated security requirement. The threshold value may be used to limit a number of biometric template bits of the biometric template that are embedded in a predetermined bit position of a cover image pixel of the cover image based on cover image intensity associated with the predetermined bit position.

20 Claims, 9 Drawing Sheets

(51) Int. Cl.
 *H04L 9/32* (2006.01)
 *G06F 21/00* (2013.01)
 *G06F 21/32* (2013.01)

(52) U.S. Cl.
 CPC ........ *G06K 9/00892* (2013.01); *G06T 1/0028* (2013.01); *H04L 9/3231* (2013.01); *G06K 2009/00953* (2013.01); *G06T 2201/0051* (2013.01); *G06T 2201/0202* (2013.01)

(58) Field of Classification Search
 USPC ....................................................... 382/100
 See application file for complete search history.

(56) References Cited

OTHER PUBLICATIONS

Khan et al: "Chaotic secure content-based hidden transmission of biometric templates", Chaos, Solitons and Frectals, Pergamon, Oxford, GB, vol. 32, No. 5, Jan. 25, 2007, pp. 1749-1759.
Chander Kant et al: "Biometrics Security using Steganography", International Journal of Security, Mar. 1, 2008, pp. 1-5.
Santhi K et al: "Biometrics based Steganography using Circular Folding in DWT Domain", International Journal of Computer Applications, Jan. 1, 2013, pp. 47-51, New York.
European Patent Office, "The extended European search report on EP Application No. 15157771.5", dated Jul. 17, 2015, 10 pages.
IP Australia, "Patent Examination Report No. 1" on Australia Patent Application No. 2015201541, dated Feb. 12, 2016, 4 pages.

* cited by examiner

|  | Range | Percentage of Pixels in the Range | Maximum Percentage of Pixels that can be Considered for Embedding |
|---|---|---|---|
| 6th Bit | 192 - 255 | 35% / 100% - High Intensity Image | $H_6$ = 63-67% |
|  |  | 6% / 100% - Low Intensity Image | $L_6$ = 8-11% |
|  |  |  |  |
| 5th Bit | 96 - 255 | 58% / 100% - High Intensity Image | $H_5$ = 42-46% |
|  |  | 15% / 100% - Low Intensity Image | $L_5$ = 18-21% |

RECEIVE IMAGE AND BIOMETRIC TEMPLATE FOR A PERSON
902

DETERMINE AT LEAST ONE THRESHOLD VALUE FOR EMBEDDING BIOMETRIC TEMPLATE BITS OF THE BIOMETRIC TEMPLATE IN $5^{TH}$ OR $6^{TH}$ BIT POSITIONS OF AN IMAGE PIXEL OF THE IMAGE
904

MULTIMODAL BIOMETRIC PROFILING

PRIORITY

This application is a Continuation of commonly assigned and co-pending U.S. patent application Ser. No. 14/481,331, filed Sep. 9, 2014, which claims priority to Indian patent application number 1900/CHE/2014, having a filing date of Apr. 11, 2014, the disclosures of which are hereby incorporated by reference in their entireties.

BACKGROUND

Biometrics typically refers to the identification of humans by their physiological and/or behavioral characteristics or traits. Examples of physiological biometric characteristics or traits typically relate to face recognition, DNA, fingerprinting, palm printing, hand geometry, iris recognition, retina recognition, and odor/scent. Examples of behavioral biometric characteristics or traits are typically related to the pattern of behavior of a person, and include typing rhythm, gait, and voice. Once such biometric information for a person is captured, the biometric information is typically stored in a secure environment for further analysis and verification of an unknown person's identity.

BRIEF DESCRIPTION OF DRAWINGS

Features of the present disclosure are illustrated by way of examples shown in the following figures. In the following figures, like numerals indicate like elements, in which:

FIG. 5 illustrates the maximum percentage of cover image pixels considered for embedding in the $6^{th}$ and $5^{th}$ bit positions, according to an example of the present disclosure;

DETAILED DESCRIPTION

Figure 1:
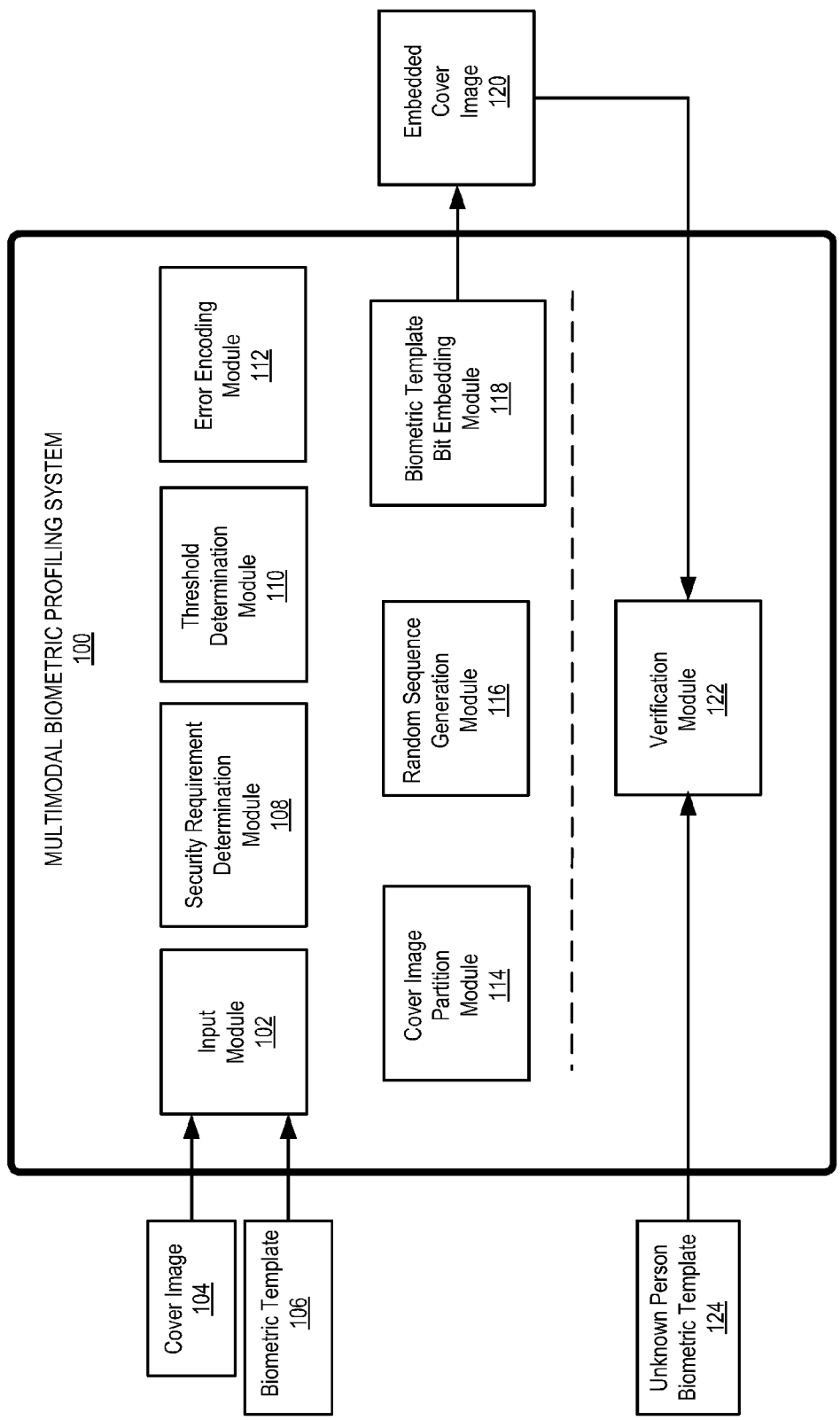
FIG. 1 illustrates a detailed architecture of a multimodal biometric profiling system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

For biometric profiling, captured biometric information is typically stored in a secure environment for further analysis and verification, for example, of an unknown person's identity. However, an unauthorized entity may intercept the biometric information as it is being routed to a storage location, and thus obtain a person's biometric information. An unauthorized entity may also modify and/or otherwise tamper with the stored biometric information to prevent accurate verification of an unknown person's identity. The option to store biometric information along with other information related to a person, such as the person's cover image, may also be limited due to the storage capacity of a database that may include biometric related information for thousands of individuals. Similarly, in the case of smart cards that have limited storage capacity, storage of biometric information along with other information related to a person may be limited. Other aspects related to biometric information may include bandwidth related limitations on the amount of data that may be transmitted through a network. For example, it may be time consuming to transmit a relatively large amount of biometric data through a low bandwidth network. A person or an entity may also be opposed to having biometric data traverse through a network, based, for example, on privacy concerns.

As biometric technologies become more widely available, the aforementioned aspects related to biometric profiling become more prevalent. As such, different applications that employ biometric profiling may accept one or more of the aforementioned limitations of current biometric technologies. For example, biometric profiling may be employed for facilitating international travel, bank automated teller machines, and even school lunch payments. Different applications that employ biometric profiling in such diverse areas may accept one or more of the aforementioned limitations of current biometric technologies. However, regardless of the limitations that are acceptable in a particular area of biometric profiling, for biometric characteristics and traits that are irrevocable for a person, if a biometric template (i.e., data related to physiological and/or behavioral characteristics or traits) of a person is compromised, that particular template may not be usable for any other purpose since the compromised template may be misused by unauthorized entities. Hence, the biometric data should be stored and transmitted in a secure manner.

One method of addressing some of the aforementioned aspects related to biometric profiling involves the use of cryptography as a mechanism for encryption of biometric templates. However, an encrypted biometric template is secure as long as the secret key is secure. Once the secret key is compromised, an unauthorized entity may modify and/or tamper with the encrypted biometric template.

A multimodal biometric profiling system and a method for multimodal biometric profiling are disclosed herein, and address the aforementioned aspects related to biometric profiling by encrypting sensitive biometric data depending on a security requirement using steganography. For the system and method disclosed herein, security requirements may be categorized based on high security applications, medium security applications, and low security applications. High security applications may include, for example, defense applications, border control, etc. Medium security applications may include, for example, civilian applications, banking applications, etc. Low security applications may include, for example, time and attendance, forensic applications, etc. The system and method disclosed herein may employ steganography to secure a biometric template according to a security requirement, and to further conceal the existence of the biometric template. According to an example, a plurality of multimodal biometric characteristics or traits may be combined into a single profile of a person, thus reducing the size of the overall biometric information. The system and method disclosed herein may provide for compression of sensitive data such that the sensitive date may be stored, for example, in a limited storage capacity of a portable token. The system and method disclosed herein may also provide for the concealment of the very existence of biometric data using steganography.

According to an example, a multimodal biometric profiling system is disclosed herein, and may include a processor. An input module that is executed by the processor may receive a cover image (e.g., a facial or another image of a person) and a biometric template (e.g., a template that includes data related to physiological and/or behavioral characteristics or traits) for a person. A security requirement determination module that is executed by the processor may receive an indication of a security requirement (e.g., high security, medium security, or low security) related to biometric profiling for the person. A threshold determination module that is executed by the processor may determine a threshold value (e.g., $y_1$ or $y_2$ as described herein) based on the indicated security requirement. The threshold value may limit a number of biometric template bits of the biometric template that are embedded in a predetermined bit position (e.g., $6^{th}$ or $5^{th}$ bit position as described herein) of a cover image pixel of the cover image based on cover image intensity (e.g., percentage of cover image pixels in intensity range 192-255 or 96-255 as described herein) associated with the predetermined bit position (e.g., $6^{th}$ or $5^{th}$ bit position as described herein).

According to an example, a method for multimodal biometric profiling is disclosed herein and may include receiving an image and a biometric template for a person. The method for multimodal biometric profiling may further include determining, by a processor, a threshold value for embedding biometric template bits of the biometric template in a $5^{th}$ or $6^{th}$ bit position of an image pixel of the image. As described herein, the image pixel of the image may be divisible into 8 bits, and a pixel intensity of the image pixel increases from bit 1 to bit 8.

According to an example, a non-transitory computer readable medium having stored thereon machine readable instructions for multimodal biometric profiling is disclosed herein. The machine readable instructions, that when executed, cause a processor to receive an image and a template to be embedded in the image. The machine readable instructions, that when executed, further cause the processor to determine a threshold value based on the image for limiting embedding of template bits of the template in a predetermined bit position of an image pixel of the image.

The multimodal biometric profiling system and the method for multimodal biometric profiling disclosed herein may provide adaptive secure biometric profiling to facilitate profiling of biometric data based on a security requirement for a particular application. Whereas an unauthorized entity may attempt to decrypt an encrypted template, the system and method disclosed herein may hide the very existence of a biometric template. The existence of a biometric template may be concealed without adding any overhead. The system and method disclosed herein may be useful in a memory constrained environment, such as, for example, for storage of biometric data on smart cards, e-passports, digital tokens, mobile devices, etc. The system and method disclosed herein may provide for the storage of multiple biometric traits in the same space that may be required for storage of a single biometric trait, which may be helpful in case of two factor authentication involving all biometric traits. For the system and method disclosed herein, the biometric information may be transmitted even on a relatively low bandwidth network. For biometrics that are used in various business services such as banks or health care areas that rely on storing biometric information of a person on portable tokens such as smart cards that have limited memory capacity, the system and method disclosed herein may provide for such business services to use multimodal biometrics of an individual, and store the multimodal biometrics securely in any memory stringent environment. Moreover, the system and method disclosed herein may provide for improved security while sending biometric data over any mode of communication channel.

The multimodal biometric profiling system and the method for multimodal biometric profiling disclosed herein provide a technical solution to technical problems related, for example, to biometric profiling. In many instances, biometric profiling can be a daunting task, for example, due to the potential of unauthorized interception of biometric information during transmittal, or unauthorized modification of biometric information. The system and method disclosed herein provide the technical solution of receiving a cover image and a biometric template for a person, and receiving an indication of a security requirement related to biometric profiling for the person. A threshold value may be determined based on the indicated security requirement. The threshold value may limit a number of biometric template bits of the biometric template that are embedded in a predetermined bit position of a cover image pixel of the cover image based on cover image intensity associated with the predetermined bit position. Based on the embedding of the biometric template in the cover image, the existence of the embedded biometric template may be concealed from an unauthorized entity.

FIG. 1 illustrates a detailed architecture of a multimodal biometric profiling system 100, according to an example of the present disclosure. The system 100 may include an input module 102 to receive a cover image 104, such as, for example, a facial image for a person. Alternatively or additionally, the cover image 104 may encompass any type of image related to a person. The input module 102 may further receive a biometric template 106 that may include a plurality of biometric templates related to various physiological and/or behavioral characteristics and/or traits of the person. The biometric template 106 may include a data stream represented by 0's and 1's (i.e., binary 0's and 1's). Alternatively or additionally, other representation techniques, such as, for example, decimal, hexadecimal, etc., may be used. A security requirement determination module 108 is to receive an indication (or a selection) of a security requirement from a plurality of security requirements that may include high security, medium security, and low security. The security requirements may relate to any type of security (e.g., high security related to defense applications, border control, etc., medium security related to civilian applications, banking applications, etc., or low security related to time and attendance, forensic applications, etc.) that is needed for securing the biometric template 106. A threshold determination module 110 is to determine a threshold value based on the indicated security requirement. The threshold value may be used to limit a number of biometric template bits of the biometric template 106 that are embedded in a predetermined bit position of a cover image pixel of the cover image 104 based on cover image intensity associated with the predetermined bit position. For example, the threshold determination module 110 is to determine threshold values for embedding biometric template bits of the biometric template 106 in the $6^{th}$ and $5^{th}$ bit positions (as described in further detail below) of cover image pixels of the cover image 104. An error encoding module 112 is to provide for error encoding of the biometric template 106. A cover image partition module 114 is to partition the cover image 104 into a plurality of predetermined blocks. A random sequence generation module 116 is to generate a random sequence to randomize selection of cover image pixels of the blocks of the cover image 104. A biometric template bit embedding module 118 is to embed a biometric template bit of the biometric template 106 in an appropriate bit position of a cover image pixel of the blocks of the cover image 104 based on a total number of 1's in predetermined bit positions of the cover image pixel of the blocks according to the randomized selection of the cover image pixels of the blocks of the cover image 104. For example, the biometric template bit embedding module 118 is to embed a biometric template bit of the biometric template 106 in an appropriate bit position of a cover image pixel of a block of the cover image 104 based on a total number of 1's in the $7^{th}$ and $8^{th}$ bit positions of the cover image pixel (e.g., for high security), or a total number of 1's in the $6^{th}$, $7^{th}$, and $8^{th}$ bit positions of the cover image pixel (e.g., for medium and low security). The biometric template bit embedding module 118 may generate an embedded cover image 120 that includes the biometric template 106 embedded therein. The embedded cover image 120 may be designated as a multimodal biometric profile. A verification module 122 is to verify an identity of an unknown person, or otherwise identify an unknown person, by generating a score that represents a comparison of an unknown person biometric template 124 to the biometric template 106 embedded in the embedded cover image 120. The score may be compared against a predetermined score threshold to determine whether there is a match.

As described herein, the modules and other elements of the multimodal biometric profiling system 100 may be machine readable instructions stored on a non-transitory computer readable medium. In addition, or alternatively, the modules and other elements of the multimodal biometric profiling system 100 may be hardware or a combination of machine readable instructions and hardware.

Figure 2:
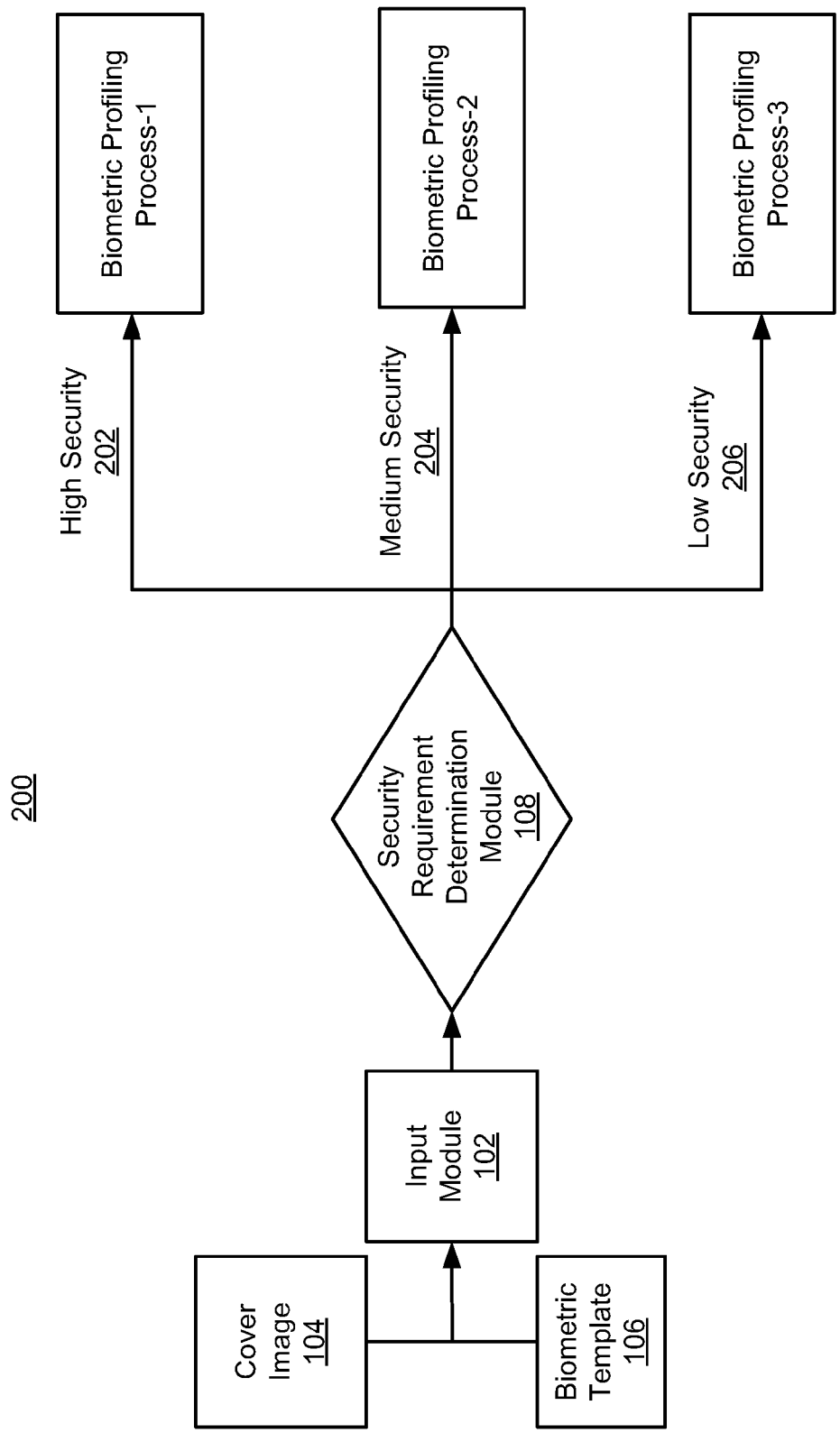
FIG. 2 illustrates a high level flow chart of operation of a security requirement determination module of the multimodal biometric profiling system of FIG. 1, according to an example of the present disclosure.

FIG. 2 illustrates a high level flow chart 200 of operation of the security requirement determination module 108, according to an example of the present disclosure. The security requirement determination module 108 may receive an indication of a security requirement from a plurality of security requirements that may include high security 202, medium security 204, and low security 206. As described in further detail herein, the indicated security requirement may be used by the biometric template bit embedding module 118 to respectively apply a biometric profiling process-1, a biometric profiling process-2, or a biometric profiling process-3, for embedding of a biometric template bit of the biometric template 106 in an appropriate bit position of a cover image pixel of a block of the cover image 104. The high security 202, medium security 204, and low security 206 security requirements may be provided in a look-up table that may be used to match a type of application to a corresponding security level. For example, as described herein, high security may be related to defense applications, border control, etc., medium security may be related to civilian applications, banking applications, etc., and low security may be related to time and attendance, forensic applications, etc. The security requirement for the same application may also change dynamically based on time. For example, in an event of a war, the security requirement of an otherwise low security application may be elevated to high. The security requirement of the same application may also change depending on geography. For example, two different countries may require different security requirements for the same application. The security requirements may also change based on compliance requirements. For example, two different countries may require different types of compliance (e.g., more stringent, or more lenient).

Figure 3:
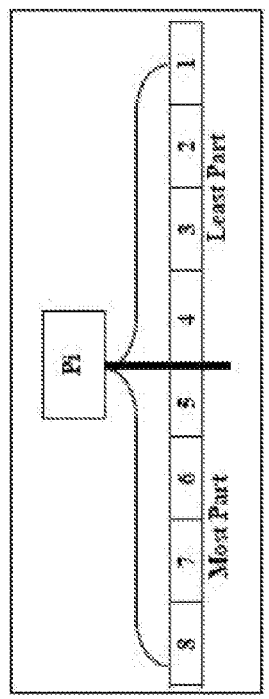
FIG. 3 illustrates a pixel divided into 8 bits, and the least and most significant parts of the pixel, according to an example of the present disclosure.

FIG. 3 illustrates a pixel divided into 8 bits, and the least and most significant parts of the pixel, according to an example of the present disclosure. With respect to the biometric profiling processes 1-3 applied by the biometric template bit embedding module 118, referring to FIGS. 2 and 3, each pixel of the cover image 104 may be divided into 8 bits. The least significant part of a pixel may be represented by bits 1-4, and the most significant part of a pixel may be represented by bits 5-8.

Figure 4:
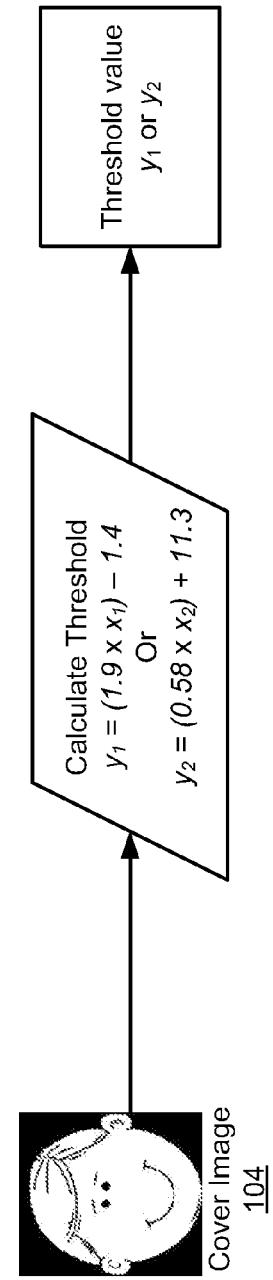
FIG. 4 illustrates threshold determination for embedding of biometric template bits in the $6^{th}$ and $5^{th}$ bit positions of cover image pixels, according to an example of the present disclosure.

FIG. 4 illustrates threshold determination for embedding of biometric template bits in the $6^{th}$ and $5^{th}$ bit positions of cover image pixels, according to an example of the present disclosure. The threshold determination module 110 may determine threshold values for embedding biometric template bits of the biometric template 106 in the $6^{th}$ and $5^{th}$ bit positions of cover image pixels. In order to determine the threshold values, the cover image 104 may be divided into three channels, namely red, green, and blue (RGB). With respect to the $6^{th}$ bit of a cover image pixel, the threshold determination module 110 may determine a value $x_1$ that represents a percentage of pixels in the intensity range 192-255. Similarly, with respect to the $5^{th}$ bit of a cover image pixel, the threshold determination module 110 may determine a value $x_2$ that represents a percentage of pixels in the intensity range 96-255. Based on the value of $x_1$, with respect to the $6^{th}$ bit, the threshold determination module 110 may determine a threshold percentage (i.e., $y_1$) of pixels that can be considered for embedding in the $6^{th}$ bit position as follows:

$$y_1 = (1.9 \times x_1) - 1.4 \qquad \text{Equation (1)}$$

Similarly, based on the value of $x_2$, with respect to the $5^{th}$ bit, the threshold determination module 110 may determine a threshold percentage (i.e., $y_2$) of pixels that can be considered for embedding in the $5^{th}$ bit position as follows:

$$y_2 = (0.58 \times x_2) - 11.3 \qquad \text{Equation (2)}$$

With respect to Equations (1) and (2), the values specified in Equations (1) and (2) may be based on a maximum percentage of cover image pixels that can be considered for embedding in $6^{th}$ and $5^{th}$ bit positions. Specifically, FIG. 5 illustrates the maximum percentage of cover image pixels considered for embedding in the $6^{th}$ and $5^{th}$ bit positions, according to an example of the present disclosure. Referring to FIGS. 4 and 5, with respect to the $6^{th}$ bit, if at least approximately 35% of the cover image pixels in the cover image 104 are in the intensity range of 192-255, then the cover image 104 may be designated as a high intensity image, and further, $H_6$ may represent a maximum percentage of cover image pixels of the cover image 104 that can be considered for embedding in the $6^{th}$ bit position. Similarly, with respect to the $6^{th}$ bit, if up to approximately 6% of the cover image pixels in the cover image 104 are in the intensity range of 192-255, then the cover image 104 may be designated as a low intensity image, and further, $L_6$ may represent a maximum percentage of cover image pixels of the cover image 104 that can be considered for embedding in the $6^{th}$ bit position. With respect to $H_6$ and $L_6$, $H_6$ may include a range of approximately 63%-67%, and approximately 65% in a particular example, and $L_6$ may include a range of approximately 8%-11%, and approximately 10% in a particular example. Generally, with respect to $H_6$ and $L_6$, $H_6$ may include a range between $H_6T_{min}$ and $H_6T_{max}$, and $L_6$ may include a range between $L_6T_{min}$ and $L_6T_{max}$. The ranges $H_6T_{min}$ and $H_6T_{max}$, and $L_6T_{min}$ and $L_6T_{max}$ may be based on a category, and further, on a type of the cover image 104 within the category. For example, the cover image 104 for a category related to ethnicities may yield different ranges for $H_6$ and $L_6$ for different types of ethnicities. For example, a typical ethnicity may include $H_6T_{min}$ and $H_6T_{max}$ of approximately 63% and 67%, respectively, and $L_6T_{min}$ and $L_6T_{max}$ of approximately 8% and 11%, respectively. A specific Caucasian ethnicity may include different values for $H_6T_{min}$ and $H_6T_{max}$, and $L_6T_{min}$ and $L_6T_{max}$. With respect to the $6^{th}$ bit, between approximately 6% and 35%, the value of $y_1$ may be based on a sliding window specified by Equation (1). With respect to the $5^{th}$ bit, if up to approximately 58% of the cover image pixels in the cover image 104 are in the intensity range of 96-255, then the cover image 104 may be designated as a high intensity image, and further, $H_5$ may represent a maximum percentage of cover image pixels of the cover image 104 that can be considered for embedding in the $5^{th}$ bit position. Similarly, with respect to the $5^{th}$ bit, if up to approximately 15% of the cover image pixels in the cover image 104 are in the intensity range of 96-255, then the cover image 104 may be designated as a low intensity image, and further, $L_5$ may represent a maximum percentage of cover image pixels of the cover image 104 that can be considered for embedding in the $5^{th}$ bit position. With respect to $H_5$ and $L_5$, $H_5$ may include a range of approximately 42%-46%, and approximately 45% in a particular example, and $L_5$ may include a range of approximately 18%-21%, and approximately 20% in a particular example. Generally, with respect to $H_5$ and $L_5$, $H_5$ may include a range between $H_5T_{min}$ and $H_5T_{max}$, and $L_5$ may include a range between $L_5T_{min}$ and $L_5T_{max}$. For example, for $H_5$, $H_5T_{min}$ and $H_5T_{max}$ are approximately 42% and 46%, respectively. Similarly, for $L_5$, $L_5T_{min}$ and $L_5T_{max}$ are approximately 18% and 21%, respectively. With respect to the $5^{th}$ bit, between approximately 15% and 58%, the value of $y_2$ may be based on a sliding window specified by Equation (2).

Figure 6:
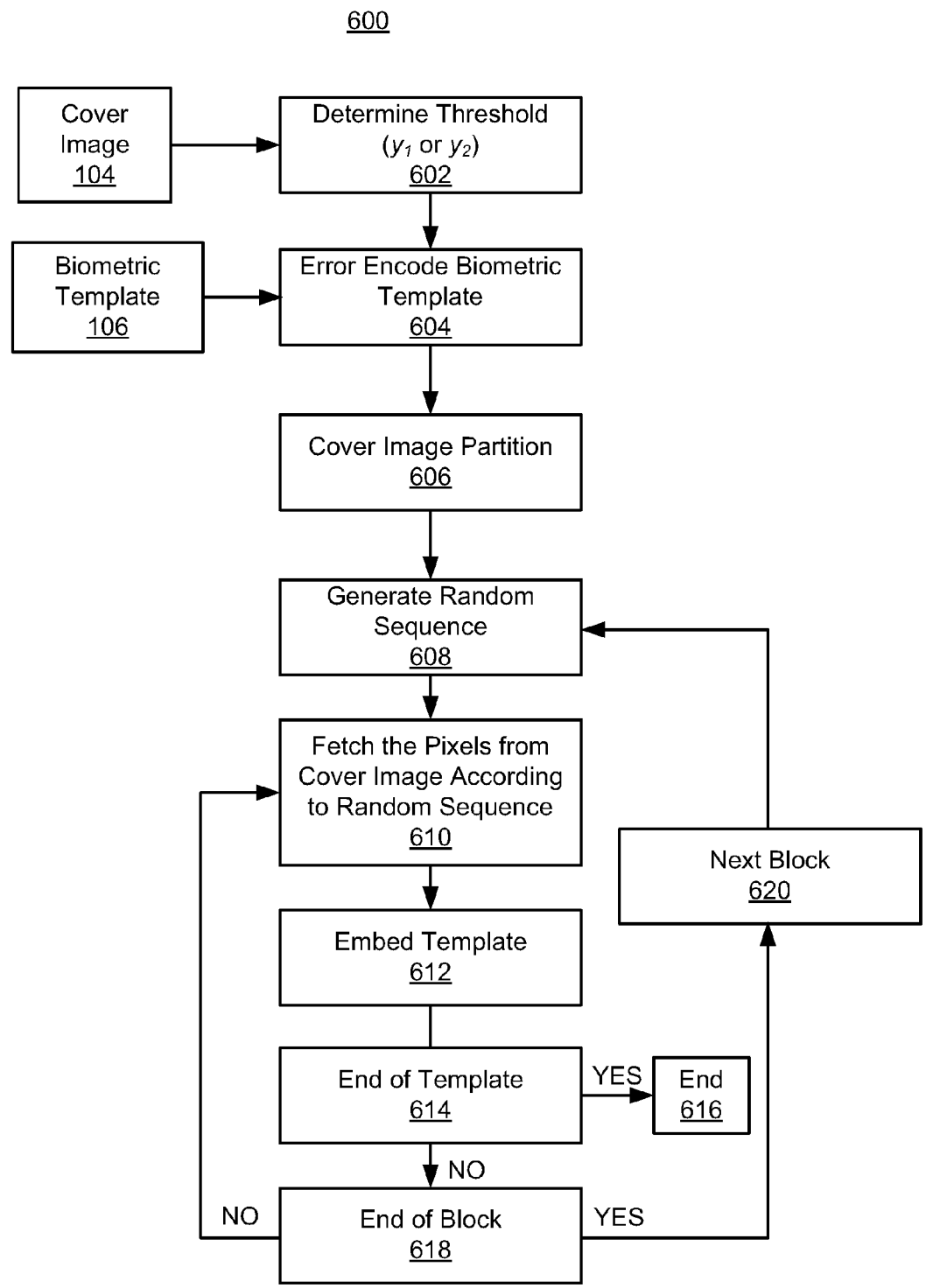
FIG. 6 illustrates a flow chart of multimodal biometric profiling implemented by the multimodal biometric profiling system of FIG. 1, according to an example of the present disclosure.

FIG. 6 illustrates a flow chart 600 of multimodal biometric profiling implemented by the multimodal biometric profiling system 100, according to an example of the present disclosure. Referring to FIGS. 2-6, the biometric profiling process-1, the biometric profiling process-2, and the biometric profiling process-3 are described for embedding of a biometric template bit of the biometric template 106 in an appropriate bit position of a cover image pixel of a block of the cover image 104.

As shown in FIG. 6, with respect to the biometric profiling process-1 that is applied based on an indication of the high security 202, at block 602, the biometric profiling process-1 may include receiving the cover image 104, and determining the threshold value $y_1$. For example, the threshold determination module 110 may determine the threshold percentage $y_1$ of cover image pixels that can be considered for embedding in the $6^{th}$ bit position using Equation (1).

With respect to the biometric profiling process-1 that is related to the high security 202, at block 604, the error encoding module 112 may error encode the biometric template 106 using an error encoding process. For example, the error encoding module 112 may error encode the biometric template 106 to protect the biometric template 106 from errors, or check for errors.

With respect to the biometric profiling process-1 that is related to the high security 202, at block 606, the cover image partition module 114 may partition the cover image 104 into a plurality of predetermined blocks. For example, the cover image 104 may be partitioned into n 8×8 pixel blocks (i.e., n blocks that include 64 pixels each).

With respect to the biometric profiling process-1 that is related to the high security 202, at block 608, the random sequence generation module 116 may generate a random sequence to randomize selection of cover image pixels of the blocks of the cover image 104. For example, for the n blocks of the cover image 104, starting with the first block, the random sequence generation module 116 may generate a random sequence to randomize selection of each of the 64 pixels of the blocks of the cover image 104.

With respect to the biometric profiling process-1 that is related to the high security 202, at block 610, the biometric template bit embedding module 118 may fetch the cover image pixels from the cover image 104 according to the random sequence generated at block 608. For example, assuming that the cover image 104 includes n blocks, for the first block of the n blocks, at block 610, the biometric template bit embedding module 118 may fetch the appropriate pixel $px_z$ (i.e., one of the 64 pixels) of the first block from the cover image 104 according to the random sequence generated at block 608.

With respect to the biometric profiling process-1 that is related to the high security 202, at block 612, the biometric template bit embedding module 118 may embed (e.g., by flipping a corresponding bit value from 0 to 1, or from 1 to 0, or otherwise changing a corresponding bit value) a biometric template bit of the biometric template 106 in an appropriate bit position of a cover image pixel of a block of the cover image 104 based on a total number of 1's in the $7^{th}$ and $8^{th}$ bit positions of the cover image pixel. For example, with respect to the biometric profiling process-1 that is related to the high security 202, assuming that the cover image 104 includes n blocks, for the first block of the n blocks, assuming that pixel $px_z$ of the first block from the cover image 104 is fetched according to the random sequence generated at block 608, the biometric template bit embedding module 118 may embed a biometric template bit of the biometric template 106 in an appropriate bit position of pixel $px_z$ of the first block of the cover image 104 based on a total number of 1's in the $7^{th}$ and $8^{th}$ bit positions of the pixel. With respect to the biometric profiling process-1 that is related to the high security 202, for block 612, the embedding of the biometric template bits of the biometric template 106 may be based on the following three cases (i.e., Case-0, Case-1, Case-2). For Case-0, if the total number of 1's in the $7^{th}$ and $8^{th}$ bit positions of cover image pixel $px_z$ is equal to 0 (i.e., both the $7^{th}$ and $8^{th}$ bits have a value of 0), then the biometric template bit embedding module 118 may embed biometric template bits of the biometric template 106 in the $1^{st}$ and $2^{nd}$ bit positions of the appropriate cover image pixel of the appropriate block of the cover image 104 (e.g., $1^{st}$ and $2^{nd}$ bit positions of the cover image pixel $px_z$ of the first block of the cover image 104 according to the random sequence generated at block 608). For Case-1, if the total number of 1's in the $7^{th}$ and $8^{th}$ bit positions of cover image pixel $px_z$ is equal to 1 (i.e., one of the $7^{th}$ and $8^{th}$ bits has a value of 1), then the biometric template bit embedding module 118 may embed biometric template bits of the biometric template 106 in the $1^{st}$, $2^{nd}$, and $3^{rd}$ bit positions of the appropriate cover image pixel of the appropriate block of the cover image 104 (e.g., $1^{st}$ $2^{nd}$, and $3^{rd}$ bit positions of the cover image pixel $px_z$ of the first block of the cover image 104 according to the random sequence generated at block 608). For Case-2, if the total number of 1's in the $7^{th}$ and $8^{th}$ bit positions of cover image pixel $px_z$ is equal to 2 (i.e., both of the $7^{th}$ and $8^{th}$ bits have a value of 1), then the biometric template bit embedding module 118 may embed biometric template bits of the biometric template 106 in the $1^{st}$ bit position, and if a biometric profiling process-1 counter value is less than $y_1$, then in the $6^{th}$ bit position, and otherwise in the $2^{nd}$ bit position of the appropriate cover image pixel of the appropriate block of the cover image 104 (e.g., $1^{st}$ bit position, and if the biometric profiling process-1 counter value is less than $y_1$, then in the $6^{th}$ bit position, and otherwise in the $2^{nd}$ bit position of the cover image pixel $px_z$ of the first block of the cover image 104 according to the random sequence generated at block 608). The biometric profiling process-1 counter value may be incremented by a biometric profiling process-1 counter that counts the number of biometric template bits of the biometric template 106 embedded in the $6^{th}$ bit position of all of the blocks of the cover image 104.

With respect to the biometric profiling process-1 that is related to the high security 202, at block 614, after embedding a biometric template bit of the biometric template 106 in an appropriate bit position of a cover image pixel of a block of the cover image 104, the biometric template bit embedding module 118 may determine whether an end of the biometric template 106 is reached (i.e., all bits of the biometric template 106 are embedded). In response to a determination that the end of the biometric template 106 is reached, processing may end at block 616. In response to a determination that the end of the biometric template 106 is not reached, processing may continue to block 618.

With respect to the biometric profiling process-1 that is related to the high security 202, at block 618, after embedding a biometric template bit of the biometric template 106 in an appropriate bit position of a cover image pixel of a block of the cover image 104, the biometric template bit embedding module 118 may determine whether an end of the block is reached (e.g., in the event all 64 pixels of the block include embedded biometric template bits of the biometric template 106). In response to a determination that the end of the block is not reached, processing may revert to block 610 to fetch another cover image pixel from the same block of the cover image 104 according to the random sequence generated at block 608. In response to a determination that the end of the block is reached, processing may proceed to block 620 to generate a random sequence to randomize selection of cover image pixels of the next block of the cover image 104. In this manner, the biometric template bit embedding module 118 may embed all of the biometric template bits of the biometric template 106 in the appropriate bit position of the cover image pixels of the blocks of the cover image 104.

As shown in FIG. 6, with respect to the biometric profiling process-2 that is applied based on selection of the medium security 204, at block 602, the biometric profiling process-2 may include receiving the cover image 104, and determining the threshold value $y_2$. For example, the threshold determination module 110 may determine the threshold percentage $y_2$ of cover image pixels that can be considered for embedding in the $5^{th}$ bit position using Equation (2).

With respect to the biometric profiling process-2 that is related to the medium security 204, the processing at blocks 604-610, and 614-620 may proceed in the same manner as discussed above with reference to the biometric profiling process-1 that is related to the high security 202.

With respect to the biometric profiling process-2 that is related to the medium security 204, at block 612, the biometric template bit embedding module 118 may embed a biometric template bit of the biometric template 106 in an appropriate bit position of a cover image pixel of a block of the cover image 104 based on a total number of 1's in the $6^{th}$, $7^{th}$, and $8^{th}$ bit positions of the pixel. For example, with respect to the biometric profiling process-2 that is related to the medium security 204, assuming that the cover image 104 includes n blocks, for the first block of the n blocks, assuming that cover image pixel $px_z$ of the first block from the cover image 104 is fetched according to the random sequence generated at block 608, the biometric template bit embedding module 118 may embed a biometric template bit of the biometric template 106 in an appropriate bit position of cover image pixel $px_z$ of the first block of the cover image 104 based on a total number of 1's in the $6^{th}$, $7^{th}$, and $8^{th}$ bit positions of the cover image pixel. With respect to the biometric profiling process-2 that is related to the medium security 204, for block 612, the embedding of the biometric template bits of the biometric template 106 may be based on the following four cases (i.e., Case-0, Case-1, Case-2, and Case-3). For Case-0, if the total number of 1's in the 6th, $7^{th}$ and $8^{th}$ bit positions of cover image pixel $px_z$ is equal to 0 (i.e., the 6th, $7^{th}$ and $8^{th}$ bits each have a value of 0), then the biometric template bit embedding module 118 may embed biometric template bits of the biometric template 106 in the $1^{st}$ and $2^{nd}$ bit positions of the appropriate cover image pixel of the appropriate block of the cover image 104 (e.g., $1^{st}$ and $2^{nd}$ bit positions of the cover image pixel $px_z$ of the first block of the cover image 104 according to the random sequence generated at block 608). For Case-1, if the total number of 1's in the 6th, $7^{th}$ and $8^{th}$ bit positions of cover image pixel $px_z$ is equal to 1 (i.e., one of the 6th, $7^{th}$ and $8^{th}$ bits has a value of 1), then the biometric template bit embedding module 118 may embed biometric template bits of the biometric template 106 in the $1^{st}$, $2^{nd}$, and $3^{rd}$ bit positions of the appropriate cover image pixel of the appropriate block of the cover image 104 (e.g., $1^{st}$ $2^{nd}$ and $3^{rd}$ bit positions of the cover image pixel $px_z$ of the first block of the cover image 104 according to the random sequence generated at block 608). For Case-2, if the total number of 1's in the $6^{th}$, $7^{th}$, and $8^{th}$ bit positions of cover image pixel $px_z$ is equal to 2 (i.e., two of the 6th, $7^{th}$ and $8^{th}$ bits have a value of 1), then the biometric template bit embedding module 118 may embed biometric template bits of the biometric template 106 in the $1^{st}$ bit position, and if a biometric profiling process-2 counter value is less than $y_2$, then in the $5^{th}$ bit position, and otherwise in the $3^{rd}$ bit position of the appropriate cover image pixel of the appropriate block of the cover image 104 (e.g., $1^{st}$ bit position, and if a biometric profiling process-2 counter value is less than $y_2$, then in the $5^{th}$ bit position, and otherwise in the $3^{rd}$ bit position of the cover image pixel $px_z$ of the first block of the cover image 104 according to the random sequence generated at block 608). For Case-3, if the total number of 1's in the $6^{th}$, $7^{th}$, and $8^{th}$ bit positions of cover image pixel $px_z$ is equal to 3 (i.e., each of the $6^{th}$, $7^{th}$ and $8^{th}$ bits has a value of 1), then the biometric template bit embedding module 118 may embed biometric template bits of the biometric template 106 in the $1^{st}$ and $2^{nd}$ bit positions, and if the biometric profiling process-2 counter value is less than $y_2$, then in the $5^{th}$ bit position, and otherwise in the $3^{rd}$ bit position of the appropriate cover image pixel of the appropriate block of the cover image 104 (e.g., $1^{st}$ and $2^{nd}$ bit positions, and if the biometric profiling process-2 counter value is less than $y_2$, then in the $5^{th}$ bit position, and otherwise in the $3^{rd}$ bit position of the cover image pixel $px_z$ of the first block of the cover image 104 according to the random sequence generated at block 608). The biometric profiling process-2 counter value may be incremented by a biometric profiling process-2 counter that counts the number of biometric template bits of the biometric template 106 embedded in the $5^{th}$ bit position of all of the blocks of the cover image 104.

Referring to FIG. 6, with respect to the biometric profiling process-3 that is applied based on selection of the low security 206, at block 602, the biometric profiling process-3 may include receiving the cover image 104. For the biometric profiling process-3 that is applied based on selection of the low security 206, a threshold value is not needed, and processing may proceed to block 604.

With respect to the biometric profiling process-3 that is related to the low security 206, the processing at blocks 604-610, and 614-620 may proceed in the same manner as discussed above with reference to the biometric profiling process-1 that is related to the high security 202, and likewise to the biometric profiling process-2 that is related to the medium security 204.

With respect to the biometric profiling process-3 that is related to the low security 206, at block 612, the biometric template bit embedding module 118 may embed a biometric template bit of the biometric template 106 in an appropriate bit position of a cover image pixel of a block of the cover image 104 based on a total number of 1's in the $6^{th}$, $7^{th}$, and $8^{th}$ bit positions of the cover image pixel. For example, with respect to the biometric profiling process-3 that is related to the low security 206, assuming that the cover image 104 includes n blocks, for the first block of the n blocks, assuming that cover image pixel $px_z$ of the first block from the cover image 104 is fetched according to the random sequence generated at block 608, the biometric template bit embedding module 118 may embed a biometric template bit of the biometric template 106 in an appropriate bit position of cover image pixel $px_z$ of the first block of the cover image 104 based on a total number of 1's in the $6^{th}$, $7^{th}$, and $8^{th}$ bit positions of the cover image pixel. With respect to the biometric profiling process-3 that is related to the low security 206, for block 612, the embedding of the biometric template bits of the biometric template 106 may be based on the following four cases (i.e., Case-0, Case-1, Case-2, and Case-3). For Case-0, if the total number of 1's in the 6th, $7^{th}$, and $8^{th}$ bit positions of cover image pixel $px_z$ is equal to 0 (i.e., the 6th, $7^{th}$, and $8^{th}$ bits have a value of 0), then the biometric template bit embedding module 118 may embed biometric template bits of the biometric template 106 in the $1^{st}$ and $2^{nd}$ bit positions of the appropriate cover image pixel of the appropriate block of the cover image 104 (e.g., $1^{st}$ and $2^{nd}$ bit positions of the cover image pixel $px_z$ of the first block of the cover image 104 according to the random sequence generated at block 608). For Case-1, if the total number of 1's in the $6^{th}$, $7^{th}$, and $8^{th}$ bit positions of cover image pixel $px_z$ is equal to 1 (i.e., one of the 6th, $7^{th}$, and $8^{th}$ bits has a value of 1), then the biometric template bit embedding module 118 may embed biometric template bits of the biometric template 106 in the $1^{st}$ and $2^{nd}$ bit positions of the appropriate cover image pixel of the appropriate block of the cover image 104 (e.g., $1^{st}$ and $2^{nd}$ bit positions of the cover image pixel $px_z$ of the first block of the cover image 104 according to the random sequence generated at block 608). For Case-2, if the total number of 1's in the $6^{th}$, $7^{th}$, and $8^{th}$ bit positions of pixel $px_z$ is equal to 2 (i.e., two of the $6^{th}$, $7^{th}$ and $8^{th}$ bits have a value of 1), then the biometric template bit embedding module 118 may embed biometric template bits of the biometric template 106 in the $1^{st}$, $2^{nd}$, and $3^{rd}$ bit positions of the appropriate cover image pixel of the appropriate block of the cover image 104 (e.g., $1^{st}$, $2^{nd}$, and $3^{rd}$ bit positions of the cover image pixel $px_z$ of the first block of the cover image 104 according to the random sequence generated at block 608). For Case-3, if the total number of 1's in the $6^{th}$, $7^{th}$, and $8^{th}$ bit positions of cover image pixel $px_z$ is equal to 3 (i.e., each of the 6th, $7^{th}$ and $8^{th}$ bits have a value of 1), then the biometric template bit embedding module 118 may embed biometric template bits of the biometric template 106 in the $1^{st}$, $2^{nd}$, and $4^{th}$ bit positions of the appropriate pixel of the appropriate block of the cover image 104 (e.g., $1^{st}$, $2^{nd}$, and $4^{th}$ bit positions of the cover image pixel $px_z$ of the first block of the cover image 104 according to the random sequence generated at block 608).

Figure 7:
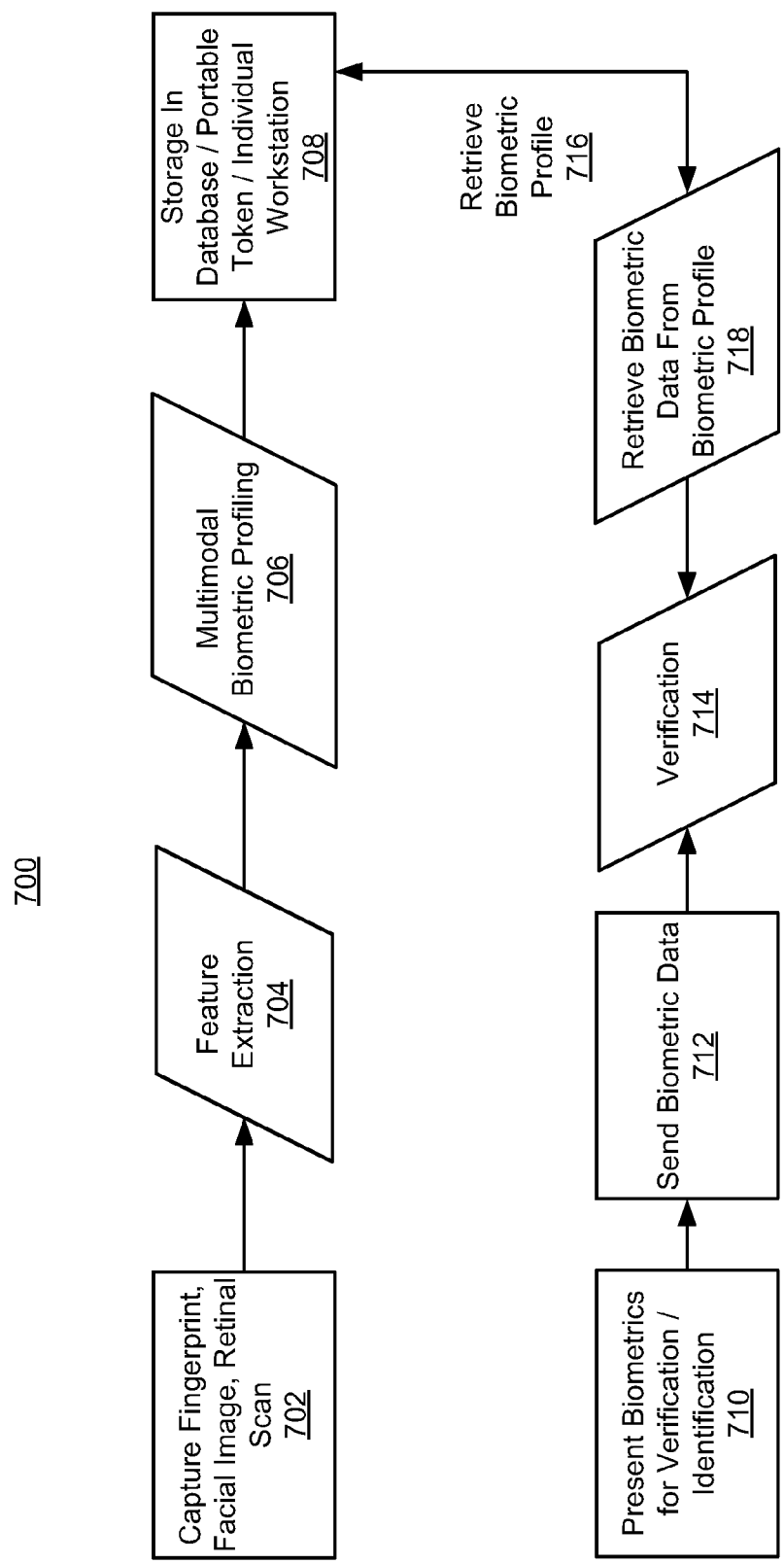
FIG. 7 illustrates a high level flow chart of multimodal biometric profiling and verification implemented by the multimodal biometric profiling system of FIG. 1, according to an example of the present disclosure.

FIG. 7 illustrates a high level flow chart 700 of multimodal biometric profiling and verification implemented by the multimodal biometric profiling system 100, according to an example of the present disclosure. At block 702, a facial image of a person may be captured. The facial image may be designated as the cover image 104. Additional physiological and/or behavioral characteristics and/or traits of the person may be captured. For example, a fingerprint and retinal scan of the person may be captured.

At block 704, various features may be extracted from the information captured at block 702. For example, retinal traits may be extracted to generate a retinal template 106. Similarly, fingerprint traits may be extracted to generate a fingerprint template 106. For each identity (i.e., identity of a person), the biometric templates 106 may be designated as follows:

$$E_i = [\text{Finger\_Print\_template}_i, \text{Face\_template}_i, \text{Iris\_template}_i \ldots] \quad \text{Equation (3)}$$

At block 706, the multimodal biometric profiling system 100 may be used to embed the biometric template 106 (e.g., the retinal template 106, the fingerprint template 106, or both) in the cover image 104 to create a secure biometric profile $P_i$. The embedding of the biometric template 106 may be based on the particular security requirement (e.g., high security 202, medium security 204, or low security 206). With respect to the high security 202, the medium security 204, and the low security 206, the secure biometric profile $P_i$ may be designated as follows:

$$\text{High Security}(P_i) = \text{BiometricProfilingProcess-1}(\text{Cover\_image} + E_i) \quad \text{Equation (4)}$$

$$\text{Medium Security}(P_i) = \text{BiometricProfilingProcess-2}(\text{Cover\_image} + E_i) \quad \text{Equation (5)}$$

$$\text{Low Security}(P_i) = \text{BiometricProfilingProcess-3}(\text{Cover\_image} + E_i) \quad \text{Equation (6)}$$

At block 708, the secure biometric profile $P_i$ may be stored, for example, in a database, in a portable token, and/or in a user's workstation.

In order to verify an unknown person's identity, at block 710, biometrics of the unknown person may be presented for verification/identification. For example, physiological and/or behavioral characteristics or traits of the unknown person may be captured. For example, a fingerprint and retinal scan of the unknown person may be captured. In a similar manner as block 704, various features may be extracted from the information captured for the unknown person. For example, retinal traits may be extracted to generate a retinal template for verification. Similarly, fingerprint traits may be extracted to generate a fingerprint template for verification. For each unknown identity (i.e., identity of the unknown person), the templates for verification may be designated as follows:

$$B_j = [\text{Finger\_Print\_template}_i, \text{Face\_template}_i, \text{Iris\_template}_i, \ldots] \quad \text{Equation (7)}$$

At block 712, the biometric data (e.g., $B_j$) may be sent to the verification module 122 for verification at block 714 of the identity of the unknown person.

At block 714, the verification module 122 may retrieve at 716 a biometric profile $P_i$ that is to be verified as belonging to the unknown person. Alternatively or additionally, the verification module 122 may retrieve a plurality of biometric profiles $P_i$ that are to be analyzed to identify the unknown person.

At block 718, the biometric data from the biometric profile $P_i$ may be retrieved. For example, the biometric data stored as $E_i$ may be retrieved.

Reverting again to block 714, the verification module 122 may generate a score that represents a comparison of a biometric template from $B_j$ (e.g., the unknown person biometric template 124) to the appropriate biometric template from $E_i$ for the verification and/or identification of the unknown person. The score may be determined as follows:

$$\text{Score} = \text{Compare}(B_j, \text{InverseBiometricProfiling}(P_i)) \quad \text{Equation (8)}$$

Thus, the score may be based on an inverse of the biometric profile $P_i$ that is to be compared to the biometric template from $B_j$. If the score exceeds a predetermined score threshold that may be user configurable, the verification module 122 may confirm the identity of the unknown person (e.g., when comparing a biometric template from $B_j$ to a biometric template from $E_i$ that should belong to the unknown person), or otherwise identify the unknown person (e.g., when comparing a template from $B_j$ to a plurality of templates from $E_i$ that are not particularly known to belong to the unknown person).

Figure 8:
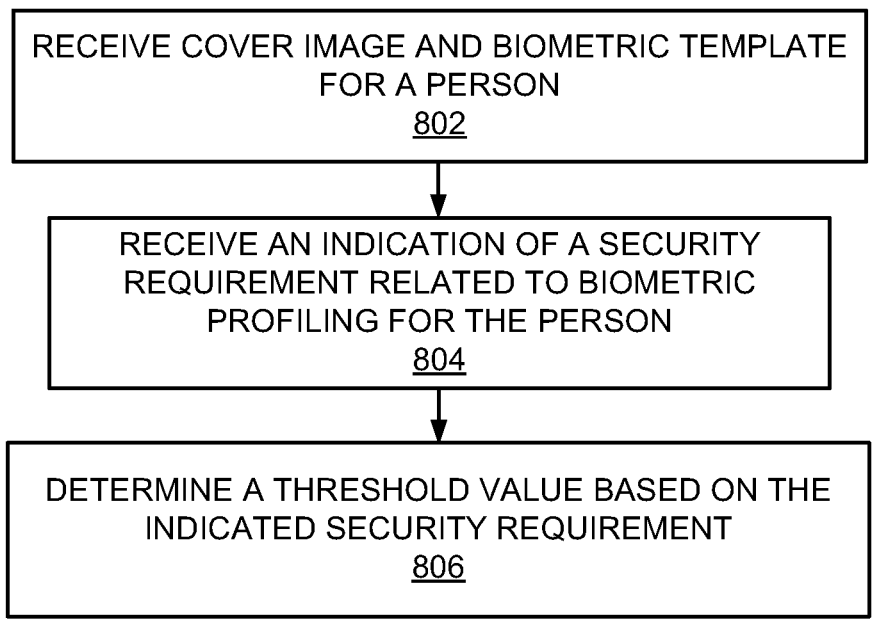
FIG. 8 illustrates a method for multimodal biometric profiling, according to an example of the present disclosure.
Figure 9:
FIG. 9 illustrates further details of the method for multimodal biometric profiling, according to an example of the present disclosure.

FIGS. 8 and 9 illustrate flowcharts of methods 800 and 900 for multimodal biometric profiling, according to examples. The methods 800 and 900 may be implemented on the multimodal biometric profiling system 100 described above with reference to FIGS. 1-7 by way of example and not limitation. The methods 800 and 900 may be practiced in other systems.

Referring to FIGS. 1 and 8, at block 802, the method 800 may include receiving a cover image and a biometric template for a person. For example, referring to FIG. 1, the input module 102 may receive the cover image 104, such as, for example, a facial image for a person, and the biometric template 106 that may include a plurality of biometric templates related to various physiological and/or behavioral characteristics and/or traits of the person.

At block 804, the method 800 may include receiving an indication of a security requirement related to biometric profiling for the person. According to an example, the security requirement may include high security, medium security, or low security. For example, referring to FIG. 1, the security requirement determination module 108 may receive an indication (or a selection) of a security requirement from a plurality of security requirements that may include high security, medium security, and low security.

At block 806, the method 800 may include determining a threshold value based on the indicated security requirement. For example, referring to FIG. 1, the threshold determination module 110 may determine a threshold value based on the indicated security requirement. The threshold value may limit a number of biometric template bits of the biometric template that are embedded in a predetermined bit position (e.g., $6^{th}$ or $5^{th}$ bit position as described herein) of a cover image pixel of the cover image based on cover image intensity (e.g., percentage of cover image pixels in intensity range 192-255 or 96-255 as described herein) associated with the predetermined bit position (e.g., $6^{th}$ or $5^{th}$ bit position as described herein).

According to an example, as described herein with reference to FIGS. 3-5, the limit on the number of biometric template bits of the biometric template that are embedded in the predetermined bit position of the cover image pixel of the cover image may include a determination of whether the cover image intensity indicates a high intensity cover image or a low intensity cover image.

According to an example, as described herein with reference to FIGS. 3-5, for the high intensity cover image, a maximum percentage of the cover image pixels that can be considered for embedding in the $6^{th}$ bit position is approximately 63% to 67%, and for the low intensity cover image, a maximum percentage of the cover image pixels that can be considered for embedding in the $6^{th}$ bit position is approximately 8% to 11%.

According to an example, as described herein with reference to FIGS. 3-5, for the high intensity cover image, a maximum percentage of the cover image pixels that can be considered for embedding in the $5^{th}$ bit position is approximately 42% to 46%, and for the low intensity cover image, a maximum percentage of the cover image pixels that can be considered for embedding in the $5^{th}$ bit position is approximately 18% to 21%.

According to an example, the method 800 may further include partitioning (e.g., by using the cover image partition module 114) the cover image into a plurality of predetermined blocks, generating a random sequence (e.g., by using the random sequence generation module 116) to randomize selection of cover image pixels of at least one of the blocks of the cover image, and embedding a biometric template bit (e.g., by using the biometric template bit embedding module 118) of the biometric template in an appropriate bit position of a cover image pixel of the at least one of the blocks of the cover image based on a total number of 1's in predetermined bit positions of the cover image pixel of the at least one of the blocks according to the randomized selection of the cover image pixels of the at least one of the blocks of the cover image.

According to an example, the method 800 may further include embedding biometric template bits of the biometric template in appropriate bit positions of a cover image pixel of a block of the cover image based on determination of a total number of 1's in $7^{th}$ and $8^{th}$ bit positions of the cover image pixel that is divided into a least part that includes bits 1-4 and a most part that includes bits 5-8. For a high security requirement, in response to a determination that the total number of 1's in the $7^{th}$ and $8^{th}$ bit positions of the cover image pixel is 0, the biometric template bits of the biometric template may be embedded in $1^{st}$ and $2^{nd}$ bit positions of the cover image pixel of the block of the cover image. For the high security requirement, in response to a determination that the total number of 1's in the $7^{th}$ and $8^{th}$ bit positions of the cover image pixel is 1, the biometric template bits of the biometric template may be embedded in $1^{st}$, $2^{nd}$, and $3^{rd}$ bit positions of the cover image pixel of the block of the cover image. For the high security requirement, in response to a determination that the total number of 1's in the $7^{th}$ and $8^{th}$ bit positions of the cover image pixel is 2, the biometric template bits of the biometric template may be embedded in $1^{st}$, and if a counter value for a $6^{th}$ bit position of the cover image pixel of the block of the cover image is less than the threshold value, then in the $6^{th}$ bit position of the cover image pixel of the block of the cover image, and otherwise in the $2^{nd}$ bit position of the cover image pixel of the block of the cover image.

According to an example, the method 800 may further include embedding biometric template bits of the biometric template in appropriate bit positions of a cover image pixel of a block of the cover image based on determination of a total number of 1's in $6^{th}$, $7^{th}$, and $8^{th}$ bit positions of the cover image pixel that is divided into a least part that includes bits 1-4 and a most part that includes bits 5-8. For a medium security requirement, in response to a determination that the total number of 1's in the in $6^{th}$, $7^{th}$, and $8^{th}$ bit positions of the cover image pixel is 0, the biometric template bits of the biometric template may be embedded in $1^{st}$ and $2^{nd}$ bit positions of the cover image pixel of the block of the cover image. For the medium security requirement, in response to a determination that the total number of 1's in the in $6^{th}$, $7^{th}$, and $8^{th}$ bit positions of the cover image pixel is 1, the biometric template bits of the biometric template may be embedded in $1^{st}$, $2^{nd}$, and $3^{rd}$ bit positions of the cover image pixel of the block of the cover image. For the medium security requirement, in response to a determination that the total number of 1's in the in $6^{th}$, $7^{th}$, and $8^{th}$ bit positions of the cover image pixel is 2, the biometric template bits of the biometric template may be embedded in $1^{st}$, and if a counter value for a $5^{th}$ bit position of the cover image pixel of the block of the cover image is less than the threshold value, then in the $5^{th}$ bit position of the cover image pixel of the block of the cover image, and otherwise in the $3^{rd}$ bit position of the cover image pixel of the block of the cover image. For the medium security requirement, in response to a determination that the total number of 1's in the in $6^{th}$, $7^{th}$, and $8^{th}$ bit positions of the cover image pixel is 3, the biometric template bits of the biometric template may be embedded in $1^{st}$ and $2^{nd}$ bit positions of the cover image pixel of the block of the cover image, and if the counter value for the $5^{th}$ bit position of the cover image pixel of the block of the cover image is less than the threshold value, then in the $5^{th}$ bit position of the cover image pixel of the block of the cover image, and otherwise in the $3^{rd}$ bit position of the cover image pixel of the block of the cover image.

According to an example, the method 800 may further include embedding biometric template bits of the biometric template in appropriate bit positions of a cover image pixel of a block of the cover image based on determination of a total number of 1's in $6^{th}$, $7^{th}$, and $8^{th}$ bit positions of the cover image pixel that is divided into a least part that includes bits 1-4 and a most part that includes bits 5-8. For a low security requirement, in response to a determination that the total number of 1's in the $6^{th}$, $7^{th}$ and $8^{th}$ bit positions of the cover image pixel is 0 or 1, the biometric template bits of the biometric template may be embedded in $1^{st}$ and $2^{nd}$ bit positions of the cover image pixel of the block of the cover image. In response to a determination that the total number of 1's in the $6^{th}$, $7^{th}$ and $8^{th}$ bit positions of the cover image pixel is 2, the biometric template bits of the biometric template may be embedded in $1^{st}$, $2^{nd}$, and $3^{rd}$ bit positions of the cover image pixel of the block of the cover image. In response to a determination that the total number of 1's in the $6^{th}$, $7^{th}$ and $8^{th}$ bit positions of the cover image pixel is 3, the biometric template bits of the biometric template may be embedded in $1^{st}$, $2^{nd}$ and $4^{th}$ bit positions of the cover image pixel of the block of the cover image.

According to an example, for a cover image pixel that is divided into a least part that includes bits 1-4 and a most part that includes bits 5-8, the cover image intensity associated with a $5^{th}$ bit position is based on a percentage of cover image pixels that are in an intensity range of 96-255 based on an intensity scale of 0-255, and the cover image intensity associated with a $6^{th}$ bit position is based on a percentage of cover image pixels that are in an intensity range of 192-255 based on the intensity scale of 0-255.

Referring to FIGS. 1 and 9, at block 902, the method 900 may include receiving an image and a biometric template for a person.

At block 904, the method 900 may include determining, by a processor, at least one threshold value for embedding biometric template bits of the biometric template in $5^{th}$ or $6^{th}$ bit positions of an image pixel of the image. According to an example, the image pixel of the image is divisible into 8 bits, and a pixel intensity of the image pixel increases from bit 1 to bit 8.

According to an example, the method 900 may further include embedding the biometric template bits of the biometric template for the person in the image to generate a biometric profile for the person, and verifying (e.g., by the verification module 122) an identity of an unknown person by comparing (e.g., as described herein with reference to FIG. 7) a biometric template for the unknown person to the biometric template from the biometric profile for the person. Verifying an identity of an unknown person by comparing a biometric template for the unknown person to the biometric template from the biometric profile for the person may further include generating a score based on the comparison of the biometric template for the unknown person to the biometric template from the biometric profile for the person, and determining whether the score exceeds a predetermined score threshold.

According to an example, the method 900 may further include embedding the biometric template bits of the biometric template for the person in the image to generate a biometric profile for the person, with the biometric profile for the person being a same size as the image.

Figure 10:
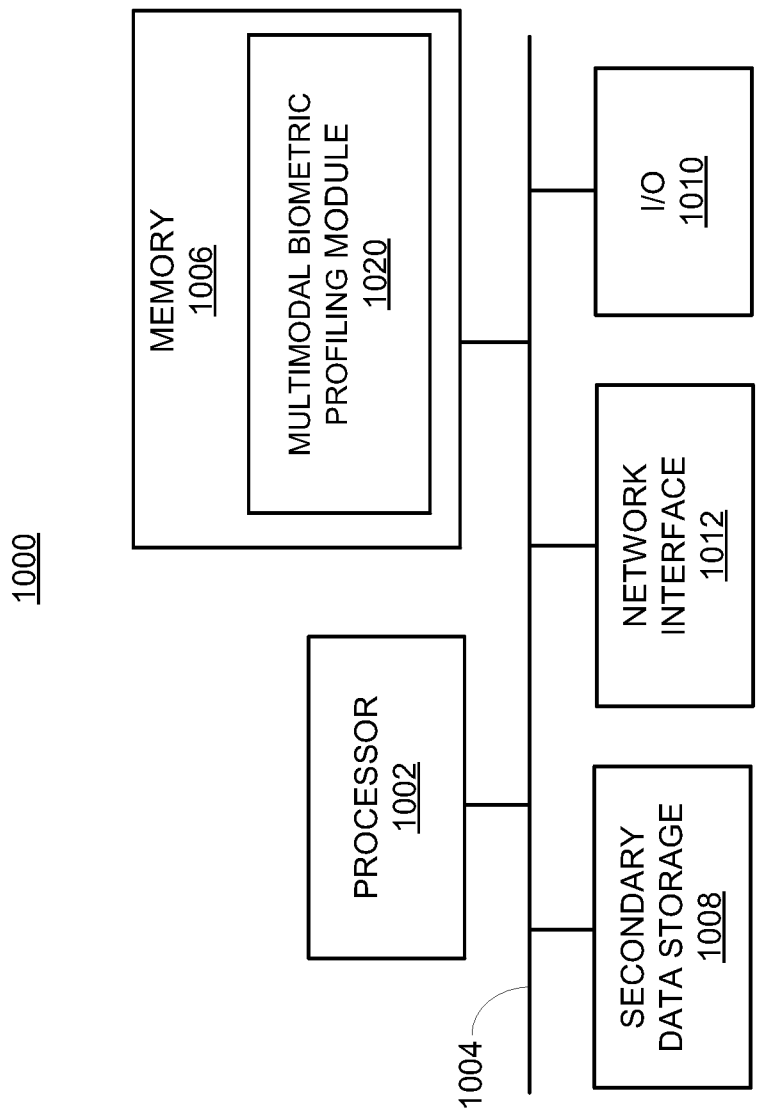
FIG. 10 illustrates a computer system, according to an example of the present disclosure.

FIG. 10 shows a computer system 1000 that may be used with the examples described herein. The computer system may represent a generic platform that includes components that may be in a server or another computer system. The computer system 1000 may be used as a platform for the system 100. The computer system 1000 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1000 may include a processor 1002 that may implement or execute machine readable instructions performing some or all of the methods, functions and other processes described herein. Commands and data from the processor 1002 may be communicated over a communication bus 1004. The computer system may also include a main memory 1006, such as a random access memory (RAM), where the machine readable instructions and data for the processor 1002 may reside during runtime, and a secondary data storage 1008, which may be non-volatile and stores machine readable instructions and data. The memory and data storage are examples of computer readable mediums. The memory 1006 may include a multimodal biometric profiling module 1020 including machine readable instructions residing in the memory 1006 during runtime and executed by the processor 1002. The multimodal biometric profiling module 1020 may include the modules of the system 100 shown in FIG. 1.

The computer system 1000 may include an I/O device 1010, such as a keyboard, a mouse, a display, etc. The computer system may include a network interface 1012 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A multimodal biometric profiling system comprising:
   at least one hardware processor; and
   a memory storing machine readable instructions that when executed by the at least one hardware processor cause the at least one hardware processor to:
      receive a cover image and a biometric template for a person;
      receive an indication of a security requirement related to biometric profiling for the person; and
   determine a threshold value based on the indicated security requirement, wherein the threshold value is to limit a number of biometric template bits of the biometric template that are embedded in a predetermined bit position of a cover image pixel of the cover image based on cover image intensity associated with the predetermined bit position.

2. The multimodal biometric profiling system according to claim 1, wherein the security requirement includes high security, medium security, or low security, and a different security requirement corresponds to a different application of the multimodal biometric profiling system.

3. The multimodal biometric profiling system according to claim 1, wherein the threshold value for a high security requirement is different from the threshold value for a medium security requirement.

4. The multimodal biometric profiling system according to claim 1, wherein the limit on the number of biometric template bits of the biometric template that are embedded in the predetermined bit position of the cover image pixel of the cover image includes a determination of whether the cover image intensity indicates a high intensity cover image or a low intensity cover image.

5. The multimodal biometric profiling system according to claim 4, wherein for a cover image pixel that is divided into a least part that includes bits 1-4 and a most part that includes bits 5-8,
   for the high intensity cover image, a maximum percentage of the cover image pixels that can be considered for embedding in the 6th bit position is approximately H6Tmin to H6Tmax, and
   for the low intensity cover image, a maximum percentage of the cover image pixels that can be considered for embedding in the 6th bit position is approximately L6Tmin to L6Tmax,
   wherein H6Tmin, H6Tmax, L6Tmin, and L6Tmax are parameters that are based on a category of the cover image.

6. The multimodal biometric profiling system according to claim 5, wherein H6Tmin, H6Tmax, L6Tmin, and L6Tmax are approximately 63%, 67%, 8%, and 11%, respectively.

7. The multimodal biometric profiling system according to claim 4, wherein for a cover image pixel that is divided into a least part that includes bits 1-4 and a most part that includes bits 5-8,
   for the high intensity cover image, a maximum percentage of the cover image pixels that can be considered for embedding in the 5th bit position is approximately H5Tmin to H5Tmax, and
   for the low intensity cover image, a maximum percentage of the cover image pixels that can be considered for embedding in the 5th bit position is approximately L5Tmin to L5Tmax,
   wherein H5Tmin, H5Tmax, L5Tmin, and L5Tmax are parameters that are based on a category of the cover image.

8. The multimodal biometric profiling system according to claim 7, wherein H5Tmin, H5Tmax, L5Tmin, and L5Tmax are approximately 42%, 46%, 18%, and 21%, respectively.

9. The multimodal biometric profiling system according to claim 1, wherein the machine readable instructions when executed by the at least one hardware processor further cause the at least one hardware processor to:
   partition the cover image into a plurality of predetermined blocks;
   generate a random sequence to randomize selection of cover image pixels of at least one of the blocks of the cover image; and
   embed a biometric template bit of the biometric template in an appropriate bit position of a cover image pixel of the at least one of the blocks of the cover image based on a total number of 1's in predetermined bit positions of the cover image pixel of the at least one of the blocks according to the randomized selection of the cover image pixels of the at least one of the blocks of the cover image.

10. The multimodal biometric profiling system according to claim 9, wherein for a cover image pixel that is divided into a least part that includes bits 1-4 and a most part that includes bits 5-8, the predetermined bit positions of the cover image pixel include the 7th and 8th bit positions of the cover image pixel.

11. The multimodal biometric profiling system according to claim 9, wherein for a cover image pixel that is divided into a least part that includes bits 1-4 and a most part that includes bits 5-8, the predetermined bit positions of the cover image pixel include the 6th, 7th, and 8th bit positions of the cover image pixel.

12. The multimodal biometric profiling system according to claim 1, wherein the machine readable instructions when executed by the at least one hardware processor further cause the at least one hardware processor to:
embed biometric template bits of the biometric template in appropriate bit positions of a cover image pixel of a block of the cover image based on determination of a total number of 1's in 7th and 8th bit positions of the cover image pixel that is divided into a least part that includes bits 1-4 and a most part that includes bits 5-8, wherein for a high security requirement,
in response to a determination that the total number of 1's in the 7th and 8th bit positions of the cover image pixel is 0, the biometric template bits of the biometric template are embedded in 1st and 2nd bit positions of the cover image pixel of the block of the cover image,
in response to a determination that the total number of 1's in the 7th and 8th bit positions of the cover image pixel is 1, the biometric template bits of the biometric template are embedded in 1st, 2nd, and 3rd bit positions of the cover image pixel of the block of the cover image, and
in response to a determination that the total number of 1's in the 7th and 8th bit positions of the cover image pixel is 2, the biometric template bits of the biometric template are embedded in 1st, and if a counter value for a 6th bit position of the cover image pixel of the block of the cover image is less than the threshold value, then in the 6th bit position of the cover image pixel of the block of the cover image, and otherwise in the 2nd bit position of the cover image pixel of the block of the cover image.

13. The multimodal biometric profiling system according to claim 1, wherein the machine readable instructions when executed by the at least one hardware processor further cause the at least one hardware processor to:
embed biometric template bits of the biometric template in appropriate bit positions of a cover image pixel of a block of the cover image based on determination of a total number of 1's in 6th, 7th, and 8th bit positions of the cover image pixel that is divided into a least part that includes bits 1-4 and a most part that includes bits 5-8, wherein for a medium security requirement,
in response to a determination that the total number of 1's in the in 6th, 7th, and 8th bit positions of the cover image pixel is 0, the biometric template bits of the biometric template are embedded in 1st and 2nd bit positions of the cover image pixel of the block of the cover image,
in response to a determination that the total number of 1's in the in 6th, 7th, and 8th bit positions of the cover image pixel is 1, the biometric template bits of the biometric template are embedded in 1st, 2nd, and 3rd bit positions of the cover image pixel of the block of the cover image,
in response to a determination that the total number of 1's in the in 6th, 7th, and 8th bit positions of the cover image pixel is 2, the biometric template bits of the biometric template are embedded in 1st, and if a counter value for a 5th bit position of the cover image pixel of the block of the cover image is less than the threshold value, then in the 5th bit position of the cover image pixel of the block of the cover image, and otherwise in the 3rd bit position of the cover image pixel of the block of the cover image, and
in response to a determination that the total number of 1's in the in 6th, 7th, and 8th bit positions of the cover image pixel is 3, the biometric template bits of the biometric template are embedded in 1st and 2nd bit positions of the cover image pixel of the block of the cover image, and if the counter value for the 5th bit position of the cover image pixel of the block of the cover image is less than the threshold value, then in the 5th bit position of the cover image pixel of the block of the cover image, and otherwise in the 3rd bit position of the cover image pixel of the block of the cover image.

14. The multimodal biometric profiling system according to claim 1, wherein the machine readable instructions when executed by the at least one hardware processor further cause the at least one hardware processor to:
embed biometric template bits of the biometric template in appropriate bit positions of a cover image pixel of a block of the cover image based on determination of a total number of 1's in 6th, 7th, and 8th bit positions of the cover image pixel that is divided into a least part that includes bits 1-4 and a most part that includes bits 5-8, wherein for a low security requirement,
in response to a determination that the total number of 1's in the 6th, 7th, and 8th bit positions of the cover image pixel is 0 or 1, the biometric template bits of the biometric template are embedded in 1st and 2nd bit positions of the cover image pixel of the block of the cover image,
in response to a determination that the total number of 1's in the 6th, 7th, and 8th bit positions of the cover image pixel is 2, the biometric template bits of the biometric template are embedded in 1st, 2nd, and 3rd bit positions of the cover image pixel of the block of the cover image, and
in response to a determination that the total number of 1's in the 6th, 7th, and 8th bit positions of the cover image pixel is 3, the biometric template bits of the biometric template are embedded in 1st, 2nd, and 4th bit positions of the cover image pixel of the block of the cover image.

15. The multimodal biometric profiling system according to claim 1, wherein for a cover image pixel that is divided into a least part that includes bits 1-4 and a most part that includes bits 5-8,
the cover image intensity associated with a 5th bit position is based on a percentage of cover image pixels that are in an intensity range of 96-255 based on an intensity scale of 0-255, and
the cover image intensity associated with a 6th bit position is based on a percentage of cover image pixels that are in an intensity range of 192-255 based on the intensity scale of 0-255.

16. A method for multimodal biometric profiling, the method comprising:
receiving, by at least one hardware processor, an image and a biometric template for a person; and
determining, by the at least one hardware processor, at least one threshold value for embedding biometric template bits of the biometric template in 5th or 6th bit positions of an image pixel of the image, wherein the image pixel of the image is divisible into 8 bits, and a pixel intensity of the image pixel increases from bit 1 to bit 8.

17. The method for multimodal biometric profiling according to claim 16, further comprising:
- embedding, by the at least one hardware processor, the biometric template bits of the biometric template for the person in the image to generate a biometric profile for the person; and
- verifying, by the at least one hardware processor, an identity of an unknown person by comparing a biometric template for the unknown person to the biometric template from the biometric profile for the person.

18. The method for multimodal biometric profiling according to claim 17, wherein verifying, by the at least one hardware processor, an identity of an unknown person by comparing a biometric template for the unknown person to the biometric template from the biometric profile for the person further comprises:
- generating, by the at least one hardware processor, a score based on the comparison of the biometric template for the unknown person to the biometric template from the biometric profile for the person; and
- determining, by the at least one hardware processor, whether the score exceeds a predetermined score threshold.

19. A non-transitory computer readable medium having stored thereon machine readable instructions for multimodal biometric profiling, the machine readable instructions when executed cause at least one hardware processor to:
- receive an image and a template to be embedded in the image; and
- determine at least one threshold value based on a security requirement associated with the multimodal biometric profiling, wherein the at least one threshold value is to limit embedding of a number of template bits of the template in at least one predetermined bit position of an image pixel of the image based on an image intensity associated with the at least one predetermined bit position.

20. The non-transitory computer readable medium of claim 19, further comprising machine readable instructions, when executed, further cause the at least one hardware processor to:
- embed the template bits of the template in the image to generate a profile, wherein the profile is a same size as the image.

* * * * *